(12) United States Patent
Hathaway et al.

(10) Patent No.: US 8,821,344 B2
(45) Date of Patent: Sep. 2, 2014

(54) CONTROLLING A TRANSMISSION SKIP CHANGE UPSHIFT

(75) Inventors: Richard R. Hathaway, Livonia, MI (US); Edward Katynski, Northville, MI (US); Pedro S. Lujan, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 415 days.

(21) Appl. No.: 13/155,651

(22) Filed: Jun. 8, 2011

(65) Prior Publication Data
US 2012/0316031 A1 Dec. 13, 2012

(51) Int. Cl.
*F16H 31/00* (2006.01)
*B60W 10/04* (2006.01)
*B60W 10/10* (2012.01)
*F16H 63/50* (2006.01)
*F16H 61/12* (2010.01)
*F16H 61/04* (2006.01)
*F16H 59/36* (2006.01)

(52) U.S. Cl.
CPC .......... *F16H 61/0403* (2013.01); *F16H 63/502* (2013.01); *F16H 61/12* (2013.01); *F16H 2061/1276* (2013.01); *F16H 2061/124* (2013.01); *F16H 2059/366* (2013.01)
USPC ........... 477/115; 477/180; 475/118; 475/120; 475/121

(58) Field of Classification Search
USPC ........................... 477/115, 180; 475/116–121
See application file for complete search history.

(56) References Cited

U.S. PATENT DOCUMENTS

| | | | | |
|---|---|---|---|---|
| 4,790,418 A | * | 12/1988 | Brown et al. | 701/51 |
| 5,795,262 A | * | 8/1998 | Robinson | 477/92 |
| 6,278,926 B1 | * | 8/2001 | Jain et al. | 701/58 |
| 6,308,125 B1 | * | 10/2001 | Gleason et al. | 701/67 |
| 6,656,087 B1 | * | 12/2003 | Runde et al. | 477/107 |
| 7,089,102 B2 | * | 8/2006 | Slayton et al. | 701/51 |
| 7,294,092 B2 | * | 11/2007 | Walker et al. | 477/107 |
| 7,706,949 B2 | * | 4/2010 | Sah et al. | 701/51 |
| 2008/0139362 A1 | * | 6/2008 | Fujii et al. | 477/109 |

* cited by examiner

*Primary Examiner* — Tisha Lewis
(74) *Attorney, Agent, or Firm* — James Dottavio; MacMillan, Sobanski & Todd, LLC

(57) ABSTRACT

A method for controlling a transmission gear change to a desired gear includes disengaging an offgoing transmission control element, changing engine speed to a synchronous speed of the desired gear, decreasing engine output torque, and engaging an oncoming transmission control element.

16 Claims, 3 Drawing Sheets

|  | 50<br>C1234 | 52<br>C35R | 56<br>CB26 | 58<br>CBLR | 60<br>C456 |
|---|---|---|---|---|---|
| 1 | X |  |  | X |  |
| 2 | X |  | X |  |  |
| 3 | X | X |  |  |  |
| 4 | X |  |  |  | X |
| 5 |  | X |  |  | X |
| 6 |  |  | X |  | X |
| REV |  | X |  | X |  |

GEAR POSITION

FRICTION ELEMENT APPLICATION CHART

Fig. 2

CONTROLLING A TRANSMISSION SKIP CHANGE UPSHIFT

BACKGROUND OF THE INVENTION

1. Field of the Invention

This invention relates generally to the control of gear shifts in an automatic transmission for a motor vehicle, particularly to the control of upshifts between nonconsecutive gears.

2. Description of the Prior Art

Failure of a single point solenoid, hydraulic system valve or clutch can result in an automatic transmission being disabled, requiring the transmission to perform upshifts that skip gears, such as an upshift from first gear to third gear (1-3), an upshift from third gear to fifth gear (3-5), an upshift from second gear to sixth gear (2-6), etc.

These shifts are much higher energy than upshifts between consecutive gears and can result in additional transmission damage due to excessive energy on an on-coming clutch, whose engagement is required to produce the target gear of the upshift. To avoid these problems when a failure has occurred, upshifts should be limited to lower vehicle speeds or full backouts, but this causes delayed upshifts until the vehicle operator backs out. A backout refers to the vehicle operator releasing the accelerator pedal.

Conventionally in performing the commanded upshift with a failure present, the oncoming clutch causes the speed ratio change, but inertia torque can still be excessive leading to damage of previously undamaged clutches.

Conventionally the transmission is locked in a single gear when a failure or fault occurs that would affect upshifting the transmission. Although this procedure has low risk of causing further transmission damage and is simple to execute its disadvantages include a need to maintain low vehicle speed particularly while operating in first or second gear, and compromised vehicle launch performance issues particularly while operating in a higher gear.

A need exists in the industry for a method for controlling a transmission after a failure that affects upshifts such that all gears of the transmission are functional and available, thereby allowing the vehicle operator to have the vehicle serviced when it is convenient.

SUMMARY OF THE INVENTION

A method for controlling a transmission gear change to a desired gear includes disengaging an offgoing transmission control element, changing engine speed to a synchronous speed of the desired gear, decreasing engine output torque, and engaging an oncoming transmission control element.

The failure mode upshift energy management strategy converts high energy gear shifts into shifts in which virtually no torque is transmitted by the oncoming control element. The torque transmitting capacity of the offgoing clutch (sometimes referred to a torque capacity) is ramped off while the energy management control calculates a target engine speed based on the desired gear and current transmission output speed. Then the control uses engine speed limiting to pull engine speed down to the synchronous speed of the target gear. As engine speed approaches the target speed, the oncoming clutch is engaged. In this way virtually no energy is transmitted through the oncoming clutch because that clutch does not reduce engine speed to the synchronous speed.

The oncoming clutch does not overcome either combustion torque or inertia torque to synchronize the speed ratio of the desired gear.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 2 is chart showing for each gear the applied and released states of the friction control elements of the transmission of FIG. 1.

DESCRIPTION OF THE PREFERRED EMBODIMENT

Figure 1:
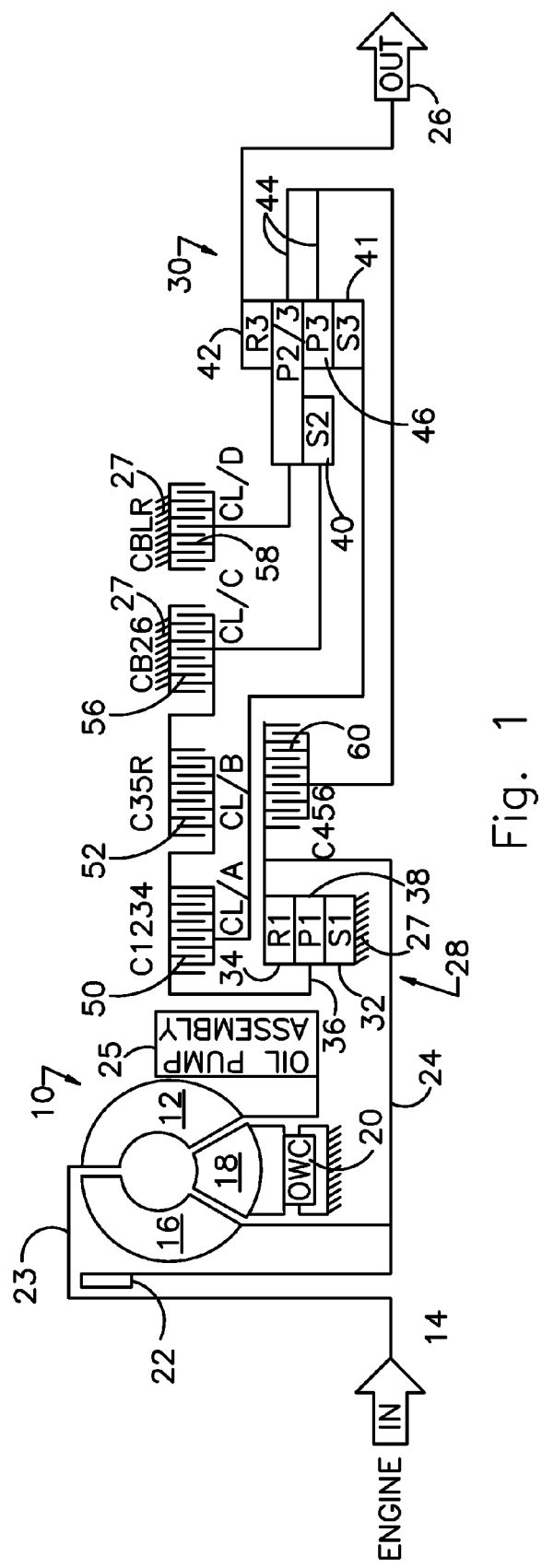
FIG. 1 is a schematic diagram of an automatic transmission.

Referring now to the drawings, there is illustrated in FIG. 1 the kinematic arrangement of an automatic transmission. A torque converter 10 includes an impeller wheel 12 connected to the crankshaft 14 of an internal combustion engine, a bladed turbine wheel 16, and a bladed stator wheel 18. The impeller, stator and turbine wheels define a toroidal fluid flow circuit, whereby the impeller 12 is hydrokinetically connected to the turbine 16. The stator 18 is supported rotatably on a stationary stator shaft, and an overrunning brake 20 anchors the stator to the shaft to prevent rotation of the stator in a direction opposite the direction of rotation of the impeller, although free-wheeling motion in the opposite direction is permitted.

The torque converter 10 includes a lockup clutch 22 located within the torque converter impeller housing 23. When clutch 22 is engaged, the turbine 16 and impeller 12 are mechanically connected to a transmission input shaft 24; when clutch 24 is disengaged, the turbine 16 and impeller 12 are hydrokinetically connected and mechanically disconnected. Fluid contained in the torque converter is supplied from the output of an oil pump assembly 25 and is returned to an oil sump, to which an inlet of the pump is connected hydraulically.

Transmission 10 is enclosed in a transmission housing 27, which is fixed against rotation to the vehicle structure. The input 24 is driven by the engine through torque converter 10. An output 26 is driveably connected to the vehicle's wheels, preferably through a differential mechanism and a set of transfer gears (not shown).

The transmission 10 includes two epicyclic gearsets 28, 30. The first gearset 28 includes a first sun gear 32, first ring gear 34, first carrier 36, and a first set of planet pinions 38, supported for rotation on carrier 36 and meshing with first sun gear 32 and first ring gear 34. Sun gear 32 is continuously fixed against rotation, preferably by a connection to the housing 27 or a front support, secured to the housing. Ring gear 34 is secured to input 24.

The second gearset 30 includes a second sun gear 40; third sun gear 41; third ring gear 42; second carrier 44; a set of short planet pinions 46, supported for rotation on second carrier 44; a set of long planet pinions 48, supported for rotation on second carrier 44 and meshing with third sun gear 41, third ring gear 42 and short planet pinions 46. The output 26 is secured to the third ring gear 42.

A forward clutch 50 (C1234) selectively opens and closes a drive connection between carrier 36 and the third sun gear 41. A direct clutch 52 (C35R) selectively opens and closes a drive connection between carrier 36 and the second sun gear 40. An intermediate brake 56 (CB26) alternately releases and holds second sun gear 40 and the output of clutch 52 against rotation. A low/reverse brake 58 (CBLR) alternately releases and holds carrier 44 against rotation. An overdrive clutch 60 (C456) selectively opens and closes a drive connection between carrier 44 and ring gear 34, which is secured to input 24.

A clutch alternately connects and disconnects two rotating components. A brake alternately holds a rotating component against rotation and releases that rotating component so that it can rotate freely. Transmission 10 includes three clutches 50, 52, 60 and two brakes 56, 58, which are sometimes referred to as friction elements or control elements.

Clutches 50, 52, 60 and brakes 56, 58 include plates, which are connected by a spline to a first member, and friction discs, which are connected by a spline to a second member, the plates and discs being interleaved. When hydraulic pressure is applied to a servo that actuates a control element, its plates and discs are forced together into mutual frictional contact, thereby increasing the torque transmitting capacity of the control element and driveably connecting the first and second members. When hydraulic pressure is vented from the servo, the control element transmits no torque, allowing the first and second members to rotate independently.

Although clutches 50, 52, 60 and brakes 56, 58 have been illustrated and described as hydraulically actuated multi-plate clutches and brakes, the invention may be practiced with alternate types of releasable connections including but not limited to dog clutches and brakes, controllable one way clutches and brakes, magnetically actuated clutches and brakes, or electrically actuated clutches and brakes.

As the table of FIG. 2 shows, third gear is produced by engaging clutches 50, 52. Fifth gear is produced by engaging clutches 52 and 60. When producing an upshift from third gear to fifth gear, clutch 52 remains engaged, forward clutch 50 (C1234) is the offgoing element, and overdrive clutch 60 (C456) is the oncoming element.

Figure 3:
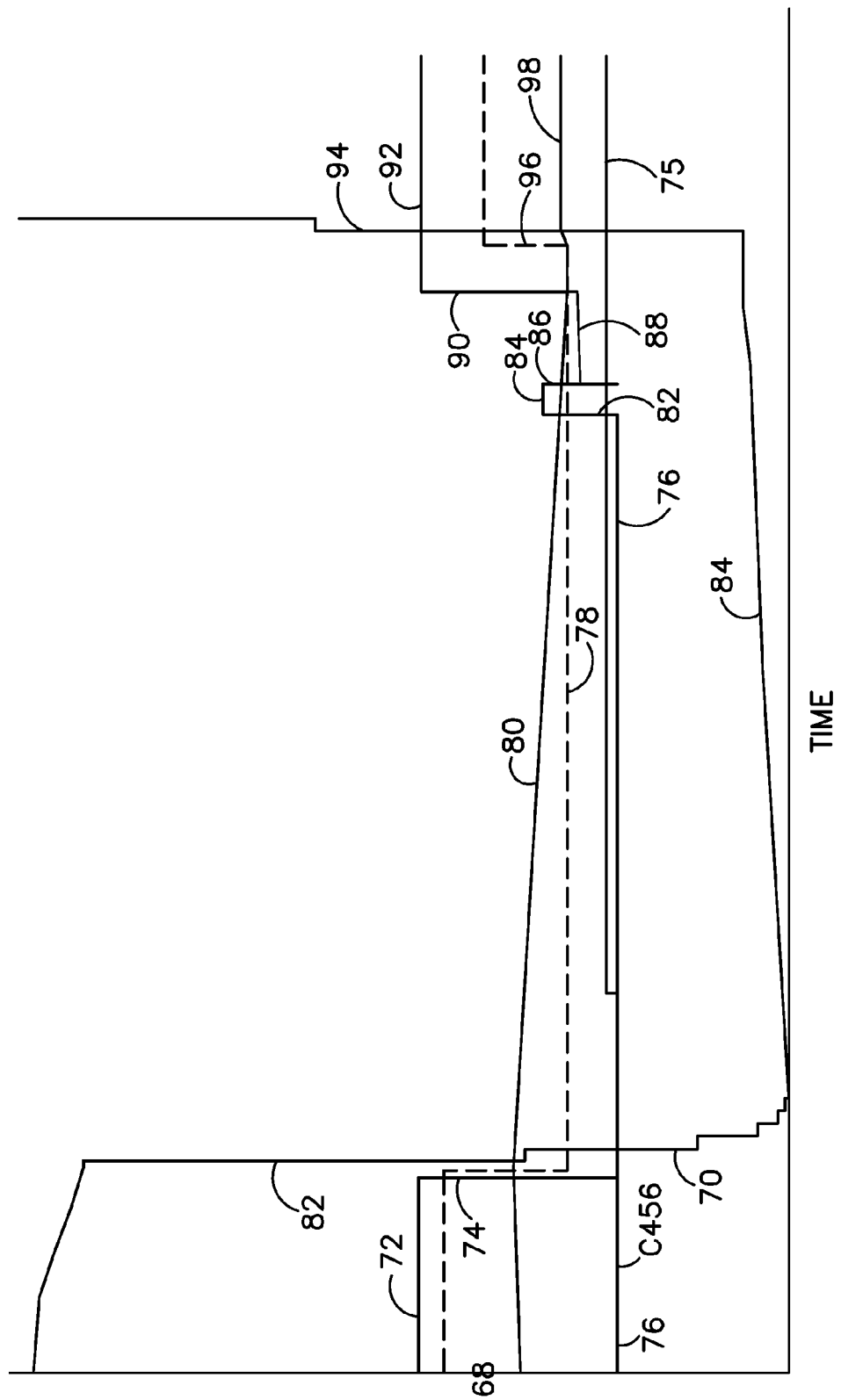
FIG. 3 is a graph show the variation of various parameters during an upshift of the transmission of FIG. 1.

As FIG. 3 shows when a 3-5 upshift is commanded by an electronic controller at time 70, the actuating servo pressure 72 of the offgoing control element C1234 decreases along a relatively steep ramp 74 to a substantially zero pressure 75 during the entire upshift. But servo pressure 76 of the oncoming control element C456 remains low and vented during a delay period. Engine speed 68 is substantially constant before the upshift command occurs.

After the upshift is commanded, the controller determines the synchronous speed 78 of the engine, i.e., the engine speed at which the speed of the transmission output 26 in the target gear (fifth gear) would be equal to the output speed in the current gear (third gear). The controller then controls engine speed 80 to decrease steadily toward the synchronous speed 78 while the oncoming control element C456 remains disengaged. The controller also decreases engine combustion torque 82 to substantially zero torque 84, while engine speed is decreasing along ramp 80.

Preferably when engine speed decreases to about 200-300 rpm greater than synchronous speed 78, pressure 76 in the oncoming control element C456 increases at 82 to a stroking pressure, which displaces the hydraulic piston of the servo that actuated oncoming control element C456, thereby removing clearances in the servo.

Servo pressure may decrease at 86 after the clutch C456 is stroked and increase thereafter to a start pressure 88. Then torque capacity of the oncoming control element C456 increases along a ramp 90 causing clutch C456 to become fully engaged with actuating pressure at line pressure 92.

After the 3-5 upshift is completed, the controller increases engine combustion torque at 94, and increases engine limit speed at 96. Engine speed after the upshift 98 is lower than before the upshift 68.

Because oncoming clutch C456 becomes engaged while engine speed is at synchronous speed, the clutch does not transmit inertia torque, which is normally required to synchronize engine speed with output speed in the target gear. Because oncoming clutch C456 is engaged while engine combustion torque 84 is substantially zero, the clutch does not transmit engine combustion torque. Therefore, the upshift is produced with a low magnitude of torque being transmitted by the oncoming clutch C456 until after the upshift is completed.

Although the 3-5 upshift has been described with reference to the offgoing and oncoming control elements being clutches, the control is applicable to gear shifts in which brakes are the participating control elements, or both clutches and brakes participate in the gear shift. The control is applicable to both upshifts and to downshifts.

In accordance with the provisions of the patent statutes, the preferred embodiment has been described. However, it should be noted that the alternate embodiments can be practiced otherwise than as specifically illustrated and described.

The invention claimed is:

1. A method for controlling a transmission upshift to a desired gear, comprising:
   (a) disengaging an offgoing transmission control element;
   (b) decreasing engine speed to a synchronous speed of the desired gear;
   (c) decreasing engine output torque;
   (d) hydraulically engaging an oncoming transmission control element by stroking a servo that actuates said control element, producing torque transmission capacity in said control element, and fully engaging said control element.

2. The method of claim 1 wherein step (a) further comprises:
   reducing hydraulic pressure in a servo that actuates the offgoing control element; and
   reducing torque capacity of the offgoing control element.

3. The method of claim 1 wherein step (d) further comprises:
   increasing hydraulic pressure in a servo that actuates the oncoming control element,
   increasing torque capacity of the oncoming control element.

4. The method of claim 1 wherein step (b) comprises:
   the decreasing of the engine speed toward the synchronous speed is during a period following a start of the gear change.

5. The method of claim 1 further comprising increasing engine speed after the oncoming control element becomes engaged.

6. The method of claim 1 wherein step (c) comprises:
   decreasing engine torque during a period following a start of the gear change.

7. The method of claim 1 further comprising increasing engine torque after the oncoming control element becomes engaged.

8. A method for controlling a transmission gear change to a desired gear, comprising:

(a) disengaging an offgoing control element;
(b) changing engine speed toward a synchronous speed of the desired gear during a period following disengagement of the offgoing control element;
(c) decreasing engine output torque to substantially zero torque during said period; and
(d) hydraulically engaging an oncoming transmission control element by stroking a servo that actuates said control element, producing torque transmission capacity in said control element, and fully engaging said control element.

9. The method of claim 8 further comprising increasing engine speed after the oncoming control element becomes engaged.

10. The method of claim 8 further comprising increasing engine torque after the oncoming control element becomes engaged.

11. The method of claim 8 wherein step (a) further comprises:
    reducing hydraulic pressure in a servo that actuates the offgoing control element; and
    reducing torque capacity of the offgoing control element.

12. The method of claim 8 wherein step (d) further comprises:
    increasing hydraulic pressure in a servo that actuates the oncoming control element
    increasing torque capacity of the oncoming control element.

13. A method for controlling a transmission upshift, comprising:
(a) disengaging an offgoing control element;
(b) reducing engine speed toward a synchronous speed of the desired gear during a period following disengagement of the offgoing control element;
(c) maintaining engine output torque at substantially zero torque during said period; and
(d) hydraulically engaging an oncoming transmission control element by stroking a servo that actuates said control element, producing torque transmission capacity in said control element, and fully engaging said control element.

14. The method of claim 13 further comprising increasing engine speed after the oncoming control element becomes engaged.

15. The method of claim 13 further comprising increasing engine torque after the oncoming control element becomes engaged.

16. The method of claim 13 wherein the upshift produces a gear change between nonconsecutive gears.

* * * * *